UNITED STATES PATENT OFFICE 2,679,967

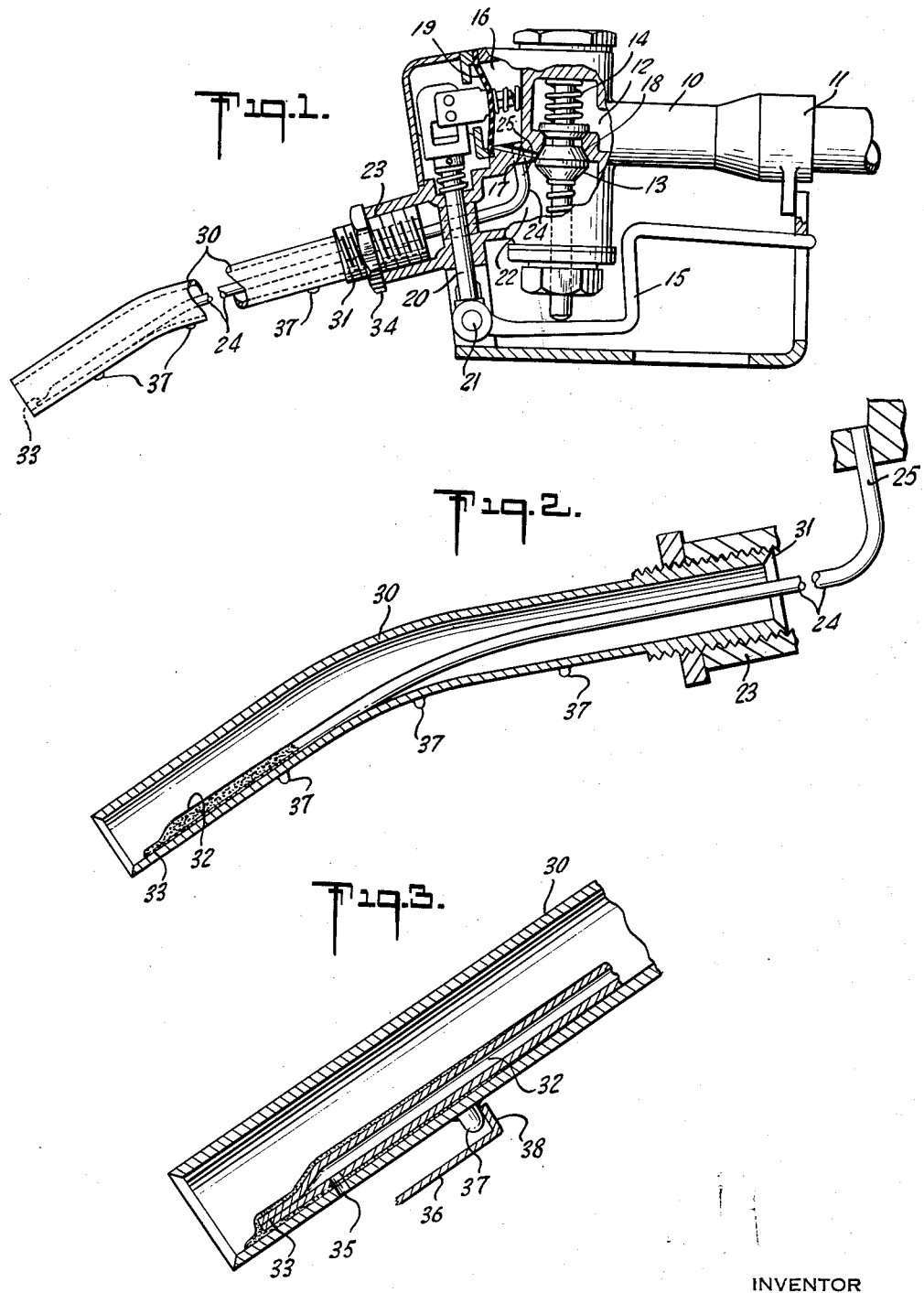
June 1, 1954     K. W. MORRISON     2,679,967
NOZZLE FOR AUTOMATIC SHUTOFF FILLING DEVICES
Filed April 5, 1952
INVENTOR
KEITH W. MORRISON
BY
ATTORNEY

NOZZLE FOR AUTOMATIC SHUTOFF FILLING DEVICES

Keith W. Morrison, Parker Ford, Pa.

Application April 5, 1952, Serial No. 280,770

6 Claims. (Cl. 226—127)

The present invention relates to automatic shutoff filling devices, and is more particularly directed towards improvements in automatic shutoff hose nozzles for use in filling the tanks of automotive equipment.

Gasoline filling stations generally employ pumps for forcing fuel through a hose line, and a nozzle, hand-operated to open position and spring biased to closed position. These nozzles may be entirely manually controlled and require attention of the attendant during the filling operation, who should close the valve before the fuel overflows, or they may be of the automatic shutoff type in which closing is effected without manual release, and in response to the sudden increase in negative pressure on a vacuum chamber.

In these automatic nozzles various means of producing the negative pressure in response to the discharge of the liquid are utilized, as shown for example in Patents 2,320,033 or 2,587,839. The air tube extends down through the liquid discharge tube and is connected to the end or the side of a heavy, rugged, tubular fitting extending crosswise of the discharge tube and internally threaded. This threaded fitting is secured to the wall of the discharge tube by a screw passing through the tube wall and provided with an air hole. Such an arrangement of tube fitting and screw requires so much room that the discharge tube used is much larger than necessary were its only function to pass the fuel into the tank opening. The usual outside diameter of this discharge tube is about 1⅛ inch. This is in contrast with the ⅞ inch diameter tube which is common in the non-automatic equipment.

So long as the air hole is open, air flows through the negative pressure chamber and the reduction in pressure is relatively small, but upon submersion of the air hole in the liquid in the tank filling spout, the negative pressure is suddenly increased. This increase in negative pressure is utilized to release the valve so that the spring is free to close it.

Operators of gasoline filling stations having the automatic shutoff valves, heretofore available, have experienced difficulty in using these valves with the newer models of cars. The filling spouts will accept the nozzle with the ⅞ inch tube, but not the nozzle with the 1⅛ inch tube. As a consequence, it is not unusual for a station, which wishes to have the advantages of the automatic shutoff valves, to also have some pumps provided with manual valves for the newer models of cars having restricted filling spouts.

Furthermore, it has been found that streamline flow of gasoline is interfered with by the air tube and the fitting so that instead of a smooth coherent stream as in the hand controlled nozzles, there is a spraying and spattering of the discharged fuel.

The discharge tube ordinarily used by both the hand controlled nozzles and the automatic nozzles utilizes relatively thin walled, brass tubing, externally threaded to fit the threads in the valve body. Cutting the threads on the tubing weakens the tubing, and the discharge tubes or spouts loosen, crack or break.

The present invention contemplates improvements in the automatic shutoff type of valve whereby the air tube may be satisfactorily mounted in the small diameter (⅞") discharge tube in a manner to avoid interference with the flow or fuel, and yet provide the air opening adapted to become submerged by the liquid rising up in the filler spout. The construction made possible by the present invention is one which allows the employment of nozzles of the automatic shutoff type for filling the tanks of all sorts of cars. It also makes it possible to provide nozzles wherein the discharge tubes are secured in place in a manner to assure long service without breaking or loosening in the threads.

The accompanying drawings show, for purposes of illustrating the present invention, one embodiment in which the invention may take form, it being understood that the drawings are illustrative of the invention rather than limiting the same.

In the accompanying drawings:

Figure 1 is a side elevational view with parts in section, showing one form of shutoff valve provided with the present improvements;

Figure 2 is an enlarged sectional view of the discharge tube and air tube at one stage of manufacture; and Figure 3 is a still further enlarged view of the lower end of the two tubes soldered together and drilled.

Figure 1 illustrates the improved structure along with a valve body and flow control mechanism of the type illustrated in Patent 2,320,003, the parts being in the automatic shutoff position. The valve body 10 has a connection at 11 for the usual hose, a main valve chamber 12, and a fuel valve 13 biased to closed position by spring 14 and operable to open position by a handle 15. The body has a negative pressure chamber 16 connected by passageway 17 to the valve seat 18 and closed by a flexible diaphragm 19 having a releasable connection with a rod or shaft 20, to the lower end of which the handle 15 is pivoted to 21.

Below the valve seat 18 is an outflow passageway 22 which leads to an internally threaded boss 23 usually of the size to receive a 1⅛ inch threaded tube. A copper tube 24 has an upper end 25 which passes through the wall of the negative pressure chamber so as to supply air to this chamber during the normal filling operation. This tube is inserted through the boss 23 and fixed in place so that most of the tube projects out beyond the valve housing.

The discharge tube 30 has a thick wall at the upper end 31 threaded to fit in the boss 23 and below the threads is of reduced outside diameter, preferably ⅞ inch. By employing the thickened wall where the threads are located the strength of the tube is not impaired by the threads. The lower end 32 of the tube 24 is flattened, and thereby tapered to facilitate stream line flow, as indicated at 33. For a distance of about 2 inches the tube is coated with soft solder before the upper end has been inserted in place. While the tube is projecting out through the opening in the boss 23, the discharge tube 30 is threaded in place and locked there by the nut 34. The lower soldered or sweated end of the tube is then brought against the inner wall of the discharge tube, and heat applied by a torch or other suitable source, applied so as to sweat or solder the two parts together. In this way the small copper tube is fixedly secured to the inner wall of the outflow or discharge tube 30. After the parts are thus secured together, a small hole is drilled as indicated at 35, this hole passing through the walls of both the discharge tube and the air tube 24.

When the filling nozzles with the air tube secured in place, as shown here, is in use, the discharged fluid traverses a passageway of uniform cross-section a substantial distance so that smooth streamline flow of the liquid is brought about and the discharge is effected without spattering and spraying about, which occurs where the air tube is connected through the fittings disposed crosswise of the stream as above described. When the fuel rises far enough in the filling neck 36 to submerge the air hole 35, the aspiration of air through the air hole to the negative pressure chamber by flowing fuel is interrupted, and the valve automatically closes as usual.

Owing to the weight of the hose and valve structure, a filling nozzle has a tendency to fall out of the filling spout should the attendant fail to hold it in place or improperly inserts it. To prevent such falling out of the filling nozzle, the discharge pipe 30, as here shown, is provided with a number of small lugs 37 (preferably brazed in position) which are adapted to drop in behind the flange 38 customarily found about the upper end of the filling spout of the automobile. These small lugs or bosses 37 do not interfere with the insertion of the discharge spout and effectively prevent unintentional removal of the nozzle.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. A filling nozzle adapted to be connected to a source of liquid under pressure and having a manually-operable valve, spring-biased to closed position, a metallic discharge tube, a vacuum chamber from which air is aspirated by the flow of liquid, a metallic air tube inside the discharge tube and having one end opening into the vacuum chamber, the other end of the air tube being closed and tapered to facilitate streamline flow, the two tubes being soldered together along a substantial portion of their length near the closed end of the air tube, and having a drilled hole through the contiguous walls to admit air to the air tube when not submerged.

2. A discharge nozzle for automatic shutoff, gasoline-tank, filling valves comprising a metal discharge tube with an external diameter of approximately ⅞ inch whereby it may be inserted into gasoline tank filling spouts of restricted diameter, and a small diameter metal air tube inside the discharge tube, the tubes being close together near the discharge end of the outer tube, the outer wall of the air tube being soldered to the inner wall of the discharge tube to provide a smooth passageway for the flow of liquid, the extreme end of the air tube being flattened and thereby permanently closed, the contiguous soldered walls having a drilled inlet passage to admit air to the tube from outside.

3. In automatic shutoff gasoline-tank filling valves having a gasoline discharge tube traversed by a small air tube flattened and thereby closed at its outer end, the improvement according to which the two tubes are soldered together for at least a portion of their length near the open end of the discharge tube to provide a smooth passageway for the flow of the liquid and the contiguous soldered walls of the tubes are provided with a drilled opening outside the discharge tube wall.

4. The combination as claimed in claim 1, wherein the inner end of said discharge tube is provided with a thickened portion provided with exterior screw threads.

5. The combination as claimed in claim 2, wherein the inner end of said discharge tube is provided with a thickened portion provided with exterior screw threads.

6. The combination as claimed in claim 3, wherein the inner end of said discharge tube is provided with a thickened portion provided with exterior screw threads.

References Cited in the file of this patent

UNITED STATES PATENTS

| Number | Name | Date |
|---|---|---|
| 101,839 | Dwyer | Apr. 12, 1870 |
| 1,514,870 | Spaeth | Nov. 11, 1924 |
| 2,302,766 | Grise | Nov. 24, 1942 |
| 2,354,209 | Hammand | July 25, 1944 |
| 2,595,166 | Rhodes | Apr. 29, 1952 |